United States Patent

[11] 3,609,175

[72] Inventor Sidney B. Richter
 Chicago, Ill.
[21] Appl. No. 678,529
[22] Filed Oct. 27, 1967
[45] Patented Sept. 28, 1971
[73] Assignee Velsicol Chemical Corporation
 Chicago, Ill.

[54] NEW SUBSTITUTED THIOCARBAMATES
 10 Claims, No Drawings
[52] U.S. Cl. .................................... 260/455 A,
 260/453 R, 424/298, 424/300
[51] Int. Cl. ....................................... C07c 155/08
[50] Field of Search ............................. 260/453,
 455 A, 471 C; 424/300; 71/100

[56] References Cited
 UNITED STATES PATENTS
3,211,770 10/1965 Pyne ........................... 424/300
3,301,885 1/1967 Richter et al. ............... 71/100
2,863,899 12/1958 Harris .......................... 260/455
2,983,747 5/1961 Campbell et al. ............ 260/455
3,066,021 11/1962 Beaver et al. ................ 260/455
3,230,243 1/1966 D'Amico ..................... 260/455
3,288,832 11/1966 Stoffel ......................... 260/455
 FOREIGN PATENTS
1,060,135 3/1967 Great Britain ............... 260/471 C
 OTHER REFERENCES
Gorskaya et al., " Derivatives of Arylhydroxylamines" (1965) CA 64 p. 2006 (1966)

Luengo, Biol. Assoc. Natl. Ingrs., " Urethanos O Carbamatos Pesticides," volume 1, number 141, pp. 11– 21, (1963).
 Metcalf, Organic Insecticides, pp. 317– 329, (1955).

*Primary Examiner*—Elbert L. Roberts
*Assistant Examiner*—G. Hollrah
*Attorney*—Robert J. Schwarz ABSTRACT: A compound of the formula:

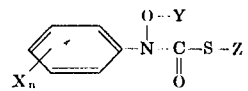

wherein n is an integer of from 0 to 5; X is selected from the group consisting of a halogen, an aliphatic radial, nitro, acyl, acyloxy, hydroxy and alkoxy; Y is selected from the group consisting of hydrogen, alkyl, phenyl and a carbamoyl radical of the formula:

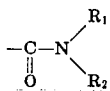

wherein $R_1$ and $R_2$ independently are selected from the group consisting of hydrogen, alkyl and phenyl; and Z is selected from the group consisting of an aliphatic radical, a cycloaliphatic radical, aryl and aralkyl. These compounds are useful as fungicides and nematocides.

NEW SUBSTITUTED THIOCARBAMATES

This invention relates to new compounds and to pesticidal compositions containing such compounds as well as to methods of using such compositions to control pests.

The compounds of this invention can be represented by the following formula:

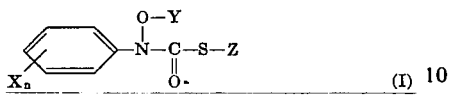  (I)

wherein $n$ is an integer from 0 to 5; X is selected from the group consisting of halogen, an aliphatic radical, nitro, acyl, acyloxy, hydroxy, and alkoxy, and when $n$ is greater than one X can be the same or different, Y is selected from the group consisting of hydrogen, alkyl, phenyl, and a carbamoyl radical of the formula:

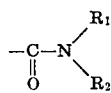

wherein $R_1$ and $R_2$ independently are selected from the group consisting of hydrogen, alkyl and phenyl; and Z is selected from the group consisting of an aliphatic radical, a cycloaliphatic radical, aryl and aralkyl. The compounds represented by the above general formula are effective as pesticides, and particularly as fungicides, and nematocides.

The compounds of this invention can be prepared by one or more general reactive steps depending upon the particular compounds desired. When compounds are desired where Y of formula I is hydrogen, that is an N-phenyl-N-hydroxy-thiocarbamate, then an N-phenyl hydroxylamine of the formula:

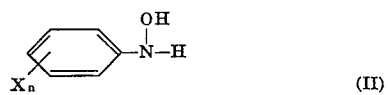  (II)

can be reacted with an ester of chlorthioformic acid of the formula:

  (III)

wherein X, $n$ and Z have the same significance as for formula I above. For example, X can be halo such as chloro, bromo, iodo or fluoro; an aliphatic radical, such as alkyl of from one to about five carbon atoms or alkenyl of from two to about five carbon atoms; nitro; acyl or acyloxy such as saturated or unsaturated acyl or acyloxy containing from one to about five carbon atoms; hydroxy; or alkoxy such as alkoxy containing from one to about five carbon atoms; and Z can be an aliphatic radical such as alkyl of from one to about five carbon atoms, alkenyl or alkynyl of from two to about five carbon atoms; a cycloaliphatic radical such as cycloalkyl or cycloalkenyl of from five to about seven carbon atoms; aryl such as phenyl or napthyl or aralkyl such as phenyl substituted alkyl where the alkyl group contains from one to about five carbon atoms. When compounds represented by formula I are desired having Y other than hydrogen, then an N-phenyl-N-hydroxy-thiocarbamate, prepared as above, can be further reacted to form the compounds with the desired Y substituent. For example, when compounds of formula I are desired where Y is a carbamoyl radical of the formula:

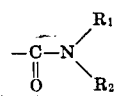

wherein $R_1$ and $R_2$ are independently selected from the group consisting of hydrogen, phenyl or an alkyl group of from one to about five carbon atoms, then the corresponding N-hydroxy-carbamate can be reacted with a suitable isocyanate or carbamoyl chloride. When compounds are desired where Y is phenyl or an alkyl group of from one to about five carbon atoms, then a corresponding N-phenyl-N-hydroxy-thiocarbamate can be O-alkylated with an appropriate alkylating agent containing the desired Y substituent.

The substituents, X, Y and Z of formula I which are illustrated above, can also be substituted, where possible, with such groups as halogen, hydroxy, alkoxy, acyl, acyloxy, nitro or combinations thereof. For example, X can be haloalkyl, such as chloromethyl, trifluormethyl; hydroxyalkyl, such as 3-hydroxypropyl; nitroalkyl, such as 2-nitroethyl; haloacyl, such as trichloroacetyl; Y can be haloalkyl, nitroalkyl, halophenyl, such as 4-chlorophenyl and the $R_1$ and $R_2$ of the carbamoyl radical can be haloalkyl or halophenyl; and Z can be haloalkyl; nitroalkyl; haloalkenyl; haloalkynyl; haloaralkyl; such as 4-chlorobenzyl or nitroaralkyl such as 4-nitrobenzyl; halophenyl such as 3-chlorophenyl; hydroxyphenyl such as 3-hydroxyphenyl or alkoxyphenyl such as 4-methoxyphenyl.

Examples of suitable N-phenyl-hydroxylamines of formula II which can be reacted with the chlorothioformate of formula III to prepare the compounds of formula I where Y is hydrogen include: N-4-chlorophenyl-hydroxylamine, N-3-chlorophenyl-hydroxylamine, N-3,4-dichlorophenyl-hydroxylamine, N-2,4,6-trichlorophenyl-hydroxylamine, N-4-bromophenyl-hydroxylamine, N-4-methylphenyl-hydroxylamine, N-3-methylphenyl-hydroxylamine, N-4-ethylphenyl-hydroxylamine, N-3,4-dimethylphenyl-hydroxylamine, N-4-chloromethylphenyl-hydroxylamine, N-4-trifluoromethylphenyl-hydroxylamine, N-4-hydroxymethylphenyl-hydroxylamine, N-3-nitrophenyl-hydroxylamine, N-4-nitrophenyl-hydroxylamine, N-4-acetylphenyl-hydroxylamine, N-4-trichloroacetylphenyl-hydroxylamine, N-3-formyloxyphenyl-hydroxylamine, N-4-acetyloxyphenyl-hydroxylamine, N-4-hydroxyphenyl-hydroxylamine, N-3-hydroxyphenyl-hydroxylamine, N-3-methoxyphenyl-hydroxylamine, N-4-ethoxyphenyl-hydroxylamine, N-3-chloro-4-methylphenyl-hydroxylamine, or N-3-chloro-4-nitrophenyl-hydroxylamine.

Examples of suitable esters of chlorothioformic acids represented by formula III which can be reacted with the above illustrated N-phenyl-hydroxylamines include: methyl chlorothioformate, ethyl chlorothioformate, 3-chloropropyl chlorothioformate, 4-chlorobutyl chlorothioformate, vinyl chlorothioformate, propen-2-yl-1-chlorothioformate, 4-chlorobuten-3yl-1 chlorothioformate, propyn-2-yl-1 chlorothioformate, butyn-2-yl-1 chlorothioformate, 2-chlorobutyn-3-yl-1 chlorothioformate, cyclopentyl chlorothioformate, cyclohexyl chlorothioformate, cyclohexen-3-yl chlorothioformate, phenyl chlorothioformate, 4-chlorophenyl chlorothioformate, benzyl chlorothioformate, or 4-chlorobenzyl chlorothioformate.

In effecting the preparational reaction of the N-phenyl hydroxylamine of formula II with the ester of chlorothioformic acid of formula III, the conditions and procedures used can be widely varied. Typically, the reaction can be effected by simply reacting the chlorothioformate with the desired N-phenyl hydroxylamine preferably in the presence of a suitable inert solvent such as dioxane or quinoline, water, and an acid acceptor such as an alkali metal carbonate or bicarbonate such as sodium bicarbonate. In conducting the reaction it is generally preferable to slowly add the chlorothioformate to a mixture of the N-phenyl hydroxylamine, solvent and acid acceptor maintained at a low temperature of the order of about $-10°$ to $5°$ C. The ratio of the reactants is not usually important and a stoichiometric quantity of the chlorothioformate and the N-pheynl hydroxylamine may be suitably used. When the reaction is complete, the desired produce can be recovered and purified by conventional techniques including filtration and recrystallization. As indicated, when thiocarbamates of formula I are desired where Y is other than hydrogen, then the N-phenyl-N-hydroxy-thiocarbamate prepared as above can be further reacted to obtain the desired Y-substituted thiocarbamate. When reacting the N-phenyl-N-hydroxy-thiocarbamate with a suitable isocyanate or carbamoyl chloride or O-alkylating with an appropriate alkylating agent, the conditions and procedures used can be widely varied. Typically, however, the conditions and procedures which are commonly used for such reactions can be suitably employed. Examples of the compounds of this invention represented by formula I, which can be thus prepared include: methyl N-3,4-dichlorophenyl-N-hydroxy-thiocarbamate, propyl N-4-chlorophenyl-N-hydroxy-thiocarbamate, 4-chlorobutyl-1 N-3'- methylphenyl-N-hydroxy-thiocarbamate, propen-2yl-1 N-4'-chloro-3'-methoxyphenyl-N-hydroxy-thiocarbamate, cyclopentyl N-phenyl-N-hydroxy-thiocarbamate, phenyl N-4'-acetylphenyl-N-hydroxy-thiocarbamate, 4-chlorophenyl N-3', 4'-dichlorophenyl-N-hydroxyl-thiocarbamate, benzyl N-4'-methoxyphenyl-N-hydroxy-thiocarbamate, 4-methoxyphenyl N-3'-nitrophenyl-N-hydroxy-thiocarbamate, butyn-3-yl-1 N-3', 4'-dimethylphenyl-N-methoxy-thiocarbamate, ethyl N-4'-chlorophenyl-N-methoxyl-thiocarbamate, benzyl N4'-trifluoromethylphenyl-N-ethoxy-thiocarbamate, isopropyl N-4-formyloxyphenyl-N-carbamoyloxy-thiocarbamate, butyn-3-yl-1 N-3,4-dichlorophenyl-N-carbamoyloxy-thiocarbamate, ethyl N-3-methyl-4-chlorophenyl-N-(N',N'-dimethylcarbamoyloxy)-thiocarbamate, or isopropyl N-4-chlorophenyl-N-(N-4-chlorophenylcarbamoloxy)-thiocarbamate.

The preparation of the compounds of this invention can be illustrated by the following examples:

EXAMPLE 1

Methyl N-4-methylphenvl-N-hydroxy-thiocarbamate was prepared by charging 12.3 grams (0.1 mol) of N-4-methylphenyl hydroxylamine, 12 grams of sodium bicarbonate, 80 grams of dioxane and 20 grams of water to a reaction flask. With stirring, about 11.0 grams (0.1 mol.) of methyl chlorothioformate were slowly added over a period of about 20 minutes with the temperature maintained at about 0° to 5° C. After stirring for about one-half hour, the reaction mixture was combined with ice water and stirred for about 15 minutes more. The solids which formed were recovered, dried, recrystallized from hexane in the presence of charcoal to yield 9.1 grams of a white-colored product having a melting point of 88° to 89° C. Analysis for $C_9H_{11}NO_2S$:

|  | C | H | S |
|---|---|---|---|
| Theoretical %: | 54.78 | 5.58 | 16.23 |
| Found %: | 54.68 | 5.92 | 16.14 |

EXAMPLE 2

Methyl N-3-chloro-4-methylphenyl-N-hydroxy-thiocarbamate was prepared by charging 15.5 grams (0.1 mol) of N-3-chloro-4-methylphenyl hydroxylamine, 12 grams of sodium bicarbonate, 80 grams of dioxane and 20 grams of water to a reaction flask. With stirring, 11 grams (0.1 mol) of methyl chlorothioformate were slowly added over a period of about 20 minutes with the temperature maintained at about 0 to 5° C. After stirring for about one-half hour, the reaction mixture was combined with ice water and stirred for about 15 minutes more. The solids which formed were recovered, dried and recrystallized from hexane in the presence of charcoal to yield 14.7 grams of a pale-yellow-colored product having a melting point of 134° to 135° C. Analysis for $C_9H_{10}ClNO_2S$:

|  | C | H | S |
|---|---|---|---|
| Theoretical %: | 46.71 | 4.35 | 46.71 |
| Found %: | 46.66 | 4.61 | 13.92 |

EXAMPLE 3 n-Propyl N-4-methylphenyl-N-hydroxy-thiocarbamate was prepared by charging 12.3 grams (0.1 mol) of N-4-methylphenyl hydroxylamine, 12 grams of sodium bicarbonate, 80 ml. of dioxane and 20 ml. of water to a reaction flask. With stirring, 13.8 grams (0.1 mol) of n-propyl chlorothioformate were slowly added over a period of about 20 minutes with the temperature maintained at about 0° to 5° C. After stirring for about one-half hour, the reaction mixture was combined with ice water and stirred for about 15 minutes more. The solids which formed were recovered, dried and recrystalized from hexane in the presence of charcoal to yield 12.0 grams of a white-colored product having a melting point of 74° to 75° C. Analysis for $C_{11}H_{15}NO_2S$:

|  | C | H | S |
|---|---|---|---|
| Theoretical %: | 58.69 | 6.72 | 14.22 |
| Found %: | 58.34 | 6.87 | 14.24 |

EXAMPLE 4 n-Propyl N-4-chlorophenyl-N-hydroxy-thiocarbamate was prepared by charging 1.43 grams (0.1 mol) of N-4-chlorophenyl hydroxylamine, 12.0 grams of sodium bicarbonate, 80 ml. of dioxane and 20 ml. of water to a reaction flask. With stirring, 13.8 grams (0.1 mol) of n-propyl chlorothioformate were slowly added over a period of about 20 minutes with the temperature maintained at about 0° to 5° C. After stirring for about one-half hour, the reaction mixture was combined with ice water and stirred for about 15 minutes more. The solids which formed were recovered, dried, and recrystallized from a benzene-hexane mixture in the presence of charcoal to yield 13.7 grams of a white-colored product having a melting point of 108° to 109° C. Analysis for $C_{10}H_{12}CNO_2S$:

|  | C | H | S |
|---|---|---|---|
| Theoretical %: | 48.92 | 4.93 | 13.04 |
| Found %: | 48.77 | 5.08 | 13.01 |

EXAMPLE 5

Methyl N-2,6-dimethylphenyl-N-hydroxy-thiocarbamate was prepared by charging 6 grams (0.044 mol) of N-2,6-dimethylphenyl-hydroxylamine, 5 grams of sodium carbonate, 50 ml. of dioxane, and 15 ml. of water to a reaction flask. With stirring, 4.9 grams (0.44 mol) of methyl chlorothioformate were slowly added over a period of about 20 minutes with the temperature maintained at about 0° to 5° C. After stirring for about one-half hour, the reaction mixture was combined with ice water and stirred for about 15 minutes more. The solids which formed were recovered, dried and recrystallized from benzene to yield 3.9 grams of a white-colored crystalline product having a melting point of 112° C. Analysis for $C_{10}H_{13}NOB2S$:

|  | C | H | S |
|---|---|---|---|
| Theoretical %: | 56.83 | 6.20 | 15.17 |
| Found %: | 57.88 | 6.29 | 15.12 |

EXAMPLE 6

Methyl N-4-chlorophenyl-N-hydroxy-thiocarbamate was prepared by charging 14 grams (0.1 mol) of N-4-chlorophenyl-hydroxylamine, 12 grams of sodium bicarbonate, 80 ml. of dioxane and 20 ml. of water to a reaction flask. With stirring 11.0 grams (0.1 mol) of methyl chlorothioformate were slowly added over a period of about 20 minutes with the temperature maintained at about 0° to 5° C. After stirring for about one-half hour, the reaction mixture was combined with ice water and stirred for about 15 minutes more. The solids which were formed were recovered, dried and recrystallized twice from benzene to yield 3.7 grams of a tan-colored, crystalline product having a melting point of 143° to 145° C. Analysis for $C_8H_8ClNO_2S$:

|  | C | H | Cl |
| --- | --- | --- | --- |
| Theoretical %: | 44.18 | 3.71 | 16.31 |
| Found %: | 44.60 | 3.83 | 16.22 |

EXAMPLE 7

Methyl N-3-chloro-4-methylphenyl-N-methoxyl-thiocarbamate was prepared by charging 5.0 grams (0.028 mol) of methyl N-3-chloro-4-methylphenyl-N-hydroxy-thiocarbamate (as prepared in example 2), 30 ml. of dioxane, 20 ml. of water and 7.5 grams of potassium carbonate to a reaction flask. With the temperature maintained at about 34° C., 3.0 grams (0.024 mol) of dimethyl sulfate were added. The mixture was stirred for about one-half hour and then was combined with ice water. The resulting solids were recovered and recrystallized from pentane and dried to yield 4.9 grams of a crystalline product having a melting point of 35° to 37° C. Analysis for $C_{10}H_{12}CNO_2S$:

|  | C | H | S |
| --- | --- | --- | --- |
| Theoretical %: | 48.92 | 4.93 | 13.04 |
| Found %: | 48.58 | 5.08 | 12.96 |

EXAMPLE 8 n-Propyl N-4-methylphenyl-N-methoxy-thiocarbamate was prepared by charging 5.0 grams (0.0238 mol) of n-propyl N-4-methylphenyl-N-hydroxy-thiocarbamate (as prepared in example 2), 30 ml. of dioxane, 20 nl. of water and 3.6 grams of potassium carbonate to a reaction flask. With the temperature maintained at about 26° to 31° C., 3.0 grams (0.0238 mol) of dimethyl sulfate were added. The mixture was stirred for about one-half hour and then combined with ice water. The resulting solids were recovered and recrystallized from pentane to yield the product.

EXAMPLE 9 n-Propyl N-4-chlorophenyl-N-methoxy-thiocarbamate was prepared by charging 5 grams (0.0215 mol) of n-propyl N-4-chlorophenyl-N-hydroxy-thiocarbamate (as prepared in example 4), 30 ml. of dioxane, 20 ml. of water and 3.6 grams of potassium carbonate to a reaction flask. With the temperature maintained at about 26° to 31° C., 3.0 grams (0.0238 mol) of dimethyl sulfate were added. The mixture was stirred for about one-half hour and then combined with ice water. The resulting solids were recovered and recrystallized from pentane to yield the product.

As indicated, the compounds of this invention are useful as pesticides and particularly as fungicides and nematocides. As used herein the term pesticide includes both fungicides and nematocides.

For practical use as pesticides, the compounds of this invention are generally incorporated into pesticidal compositions which comprise an inert carrier and a pesticidally toxic amount of such a compound. Such pesticidal compositions, which can also be called formulations, enable the active compound to be applied conveniently, in any desired quantity, to the site of the pest infestation. These compositions can be solids such as dusts, granules, or wettable powders, or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases, the compounds are sufficiently soluble in common organic solvents such as kerosene or xylene so that they can be used directly dissolved in such solvents. Frequently, these solutions can be dispersed under supcratmospheric pressure as aerosols. However, preferred liquid pesticidal compositions are emulsifiable concentrates, which comprise one or more compound according to this invention and as the inert carrier, a solvent and an emulsifier. Such emulsifiable concentrates can be extended with water and/or oil to any desired concentration of the compound for application as sprays to the site of the pest infestation. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 10

Product of Example 1
Powdered Talc 90

The above ingredients are mixed in a mechanical grinder-blender and are ground until a homogenous, free-flowing dust of the desired particle size is obtained. This dust is suitable for direct application to the site of the pest infestation.

The compounds of this invention can be applied as pesticides in any manner recognized by the art. One method for destroying pests comprises applying to the locus of the pest infestation a pesticidal composition comprising an inert carrier and as the essential active ingredient, in a quantity which is toxic to said pests. The concentration of at least one of the compounds of this invention individually or in admixture in the pesticidal compositions will vary greatly depending on the type of formulation and the purpose for which it is designed, but generally the compositions will contain from about 0.05 to about 95 percent by weight of the compounds of this invention. In a preferred embodiment of this invention, the pesticidal compositions will contain from about 5 to 75 percent by weight of the compound. The compositions can also contain additional substances such as other pesticides, stabilizers, spreaders, deactivators, adhesives, stickers, fertilizers, or activators.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf on wheat (*Puccinia rubigo-vera*), and such common soil fungi as fusarium wilt (*Fusarium oxysporum*), the seed rot fungus (*Phythium debaranum*), and the sheath and culm blight (*R*-

*hizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only 1 or 2 ounces of active compound per acre of a crop may be sufficient to control a light infestation of certain fungi, a pound or more of active compound per acre may be required to control a heavy infestation of a hardy species of fungus.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than aboveground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence, the most common types of nematode damage are manifested as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage applications, postplanting sidedress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made.

The compounds of this invention can be combined with different fungicides or nematocides or combinations thereof to form either synergistic pesticide compositions or pesticide compositions capable of more than pesticidal activity such as a pesticidal composition having both fungicidal and nematocidal activity. For example, the compounds may be combined with fungicides such as ferbam, nabam, zineb, ziram, thiram, chloranil, dichlone, glyodin, cycloheximide, dinocap, maneb, captan, dodine, p-dimethylaminobenzenediazo sodium sulfonate and with nematocides such as chloropicrin, 0,0-diethyl 0-(2,4-dichlorophenyl) phosphorothioate, tetrachlorothiophene, dazomet, or dibromochloropropane.

The pesticidal activity of the compounds of this invention can be illustrated by the following examples.

EXAMPLE 11

The fungicidal activity of the compounds of this invention can be demonstrated by the following.

An emulsifiable concentration containing the test compound at a rate of 25 mg. per ml. was prepared by dissolving the compound in a suitable solvent such as acetone containing a surface active agent (polyoxyalkylene derivatives of sorbitan 1,000 and/or monoleate, 2.48 mg. per 80 ml. of acetone.

The compounds were used to control the fungus *Puccinia rubigo-vera* (Leaf rust of wheat). An aqueous fungicidal composition was prepared by admixing the above prepared emulsifiable concentrate with sufficient water to provide a concentration of 1,000 p.p.m. by weight of the test compound. A series of 7-day-old Henry wheat plants were treated with the fungicidal composition by spraying the plants for a period of about 30 seconds at a spray pressure of 80 pounds per square inch. Another series of plants were not so treated and were used for comparative purposes. After the treated plants had dried, both the treated and untreated plants were inoculated with a 9- to 13-day-old culture of the fungus. The plants were then stored under conditions favorable to fungus growth for a period of about 8 days. At the end of the period the plants were examined to determine the extent of fungus growth. The growth of the fungus on the treated plants was measured and rated in comparison with the untreated plants. The results of the test are as follows:

| Test Compound | Conc. Test Compound p.p.m. | Percent Control |
|---|---|---|
| Methyl N-4-methylphenyl-N-hydroxy-thiocarbamate | 1,000 | 97.7 |
| Methyl N-2,6-dimethylphenyl-N-hydroxy-thiocarbamate 6-dimethylphenyl-N-hydroxy-thiocarbamate | 1,000 | 95.4 |

The compounds were used to control the fungus *Phytophthora infestans* (tomato late blight fungus). An aqueous fungicidal composition was prepared as above to provide a concentration of 1,000 p.p.m. by weight of the test compound. Susceptible species of tomato plants growing in soil in individual paper pots were treated by spraying with fungicidal composition when they had grown to a height of approximately 6 to 8 inches. Some of the plants were not sprayed and were used for comparative purposes. After the sprayed plants had dried, both series of plants were sprayed with a suspension of the fungus spores which had been reared on lima bean agar. After a few days to 1 week, disease symptoms in the treated plants were observed and rated in comparison to the untreated plants. The results of the test are as follows:

| Test Compound | Conc. Test Compound p.p.m. by weight | Percent Control |
|---|---|---|
| Methyl N3-chloro-4-methylphenyl-N-hydroxy thiocarbamate | 1,000 | 96.3 |
| n-Propyl N-4-chlorophenyl-N-hydroxy-thiocarbamate | 1,000 | 91.7 |

A compound was used to control the fungus, *Erysiphe cichoracearum*, powdery mildew fungus. A fungicidal composition was prepared as above having a concentration of 1,000 p.p.m. by weight. Susceptible species of cucumbers were grown in soil in plastic pots with two to three plants per pot. After the cucumber plants were 10 to 14 days old, they were sprayed with fungicidal composition. Another series of plants was not sprayed and was used for comparative purposes. After the sprayed plants had dried, each plant in both series were surrounded by three plants infested with the powdery mildew fungus. After 9 to 14 days, the extent of the disease was observed and rated in comparison with the untreated plants. The results of the test are as follows:

| Test Compound | Conc. Test Compound p.p.m. by weight | Percent Control |
|---|---|---|
| Methyl N-4-chlorophenyl-N-hydroxy-thiocarbamate | 1000 | 95.0 |

EXAMPLE 12

The nematocidal activity of the compounds of this invention can be illustrated by the following:

The compounds were used to control rootknot nematodes. A sample of inoculated soil was prepared by mixing one part of sand, four parts of sterilized soil and three parts of soil from a 4-month-old rootknot nematode culture (*Meloidogyne spp.*). A portion of the soil sample was treated by mixing a measured amount of the emulsifiable concentrate as prepared in example 11 in an amount sufficient to provide the soil with the desired concentration of the compound. Another portion of the soil was not so treated and was used for comparative purposes. The treated soil as well as the untreated soil was placed into a series of plastic bags contained in glass mason jars. The jars were sealed and stored at 70° F. for a period of about 7 days. At the end of this period, the soil was transferred to plastic pots and tomato seedlings (Bonny Best) were planted in the soil. After 20 days, the soil was washed from the tomato plants and the number of rootknot nematode galls on the plants were counted. The degree of the nematode control of the test compound was evaluated on a percentage basis in comparison to the degree of galling in the untreated plants. The results of the tests are as follows:

| Test Compound | Conc. Test Compound lbs. per 4 Inch Acre | Percent Control |
|---|---|---|
| n-Propyl N-4-chlorophenyl-N-hydroxy-thiocarbamate | 100 | 90.4 |
| Methyl N-4-chloropheynyl-N-hydroxy-thiocarbamate | 100 | 100.0 |
| Methyl N-4-chlorophenyl-N-hydroxy-thiocarbamate | 40 | 95.5 |

The nematocidal activity of the compounds was also demonstrated in another test for the control of rootknot nematodes on tomato plants. An inoculated soil sample prepared as above was placed in 4-inch plastic pots and manually compacted. The soil in one series of the pots was treated by drenching the soil in each pot with a quantity of the nematocidal composition, prepared as above, sufficient to provide the desired concentration of the test compound. Another series of pots was not so treated was used for comparative purposes. Both series of pots were placed in a greenhouse and held for 7 days and then 10- to 14-days-old tomato seedlings (Bonny Best) were planted in the pots. After about 2 weeks, the degree of nematode control was evaluated by comparing the number of rootknot nematode galls on the roots of the plants grown in the treated soil with the number of the galls on the plants grown in the untreated soil. The results of the test were as follows:

| Test Compound | Conc. lbs. per acre of 4 inch depth | Percent Control |
|---|---|---|
| Methyl N-4-methylphenyl N-hydroxy-thiocarbamate | 100 | 100.0 |

I claim:

1. A compound of the formula

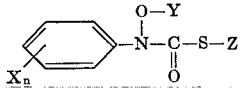

wherein *n* is an integer of from 0 to 3; X is selected from the group consisting of a halogen; an alkyl, haloalkyl, hydroxyalkyl and nitroalkyl of one to five carbon atoms; nitro; formyl; acetyl; haloacetyl; formyloxy; acetyloxy; haloacetyloxy; hydroxy and alkoxy of one to five carbon atoms; Y is selected from the group consisting of hydrogen; phenyl; halophenyl; alkylphenyl wherein the alkyl substituents are of one to five carbon atoms; hydroxyphenyl and a carbamoyl radical of the formula

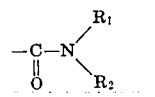

wherein $R_1$ and $R_2$ independently are selected from the group consisting of hydrogen; alkyl and haloalkyl of one to five carbon atoms; phenyl and halophenyl; and Z is selected from the group consisting of alkyl, haloalkyl, and nitroalkyl of one to five carbon atoms; alkenyl, haloalkenyl, alkynyl, and haloalkynyl of two to five carbon atoms; cycloalkyl or cycloalkenyl of from five to seven carbon atoms.

2. The compound of claim 1 wherein Y is hydrogen.
3. The compound of claim 1 wherein Z is selected from the group consisting of alkyl of one to about five carbon atoms, alkenyl and alkynyl of from two to about five carbon atoms.
4. The compound of claim 3 wherein Z is alkyl of from one to about five carbon atoms.
5. The compound of claim 1 wherein Z is selected from the group consisting of alkyl of from one to about five carbon atoms.
6. The compound of claim 1 wherein it is methyl N-4-methylphenyl-N-hydroxy-thiocarbamate.
7. The compound of claim 1 wherein it is methyl N-3-chloro-4-methylphenyl-N-hydroxy-thiocarbamate.
8. The compound of claim 1 wherein it is n-propyl N-4-methylphenyl-N-hydroxy-thiocarbamate.
9. The compound of claim 1 wherein it is n-propyl N-4-chlorophenyl-N-hydroxy-thiocarbamate.
10. The compound of claim 1 wherein it is methyl N-2,6-dimethylphenyl-N-hydroxy-thiocarbamate.

PO-1050
(5/69)

UNITED STATES PATENT OFFICE
CERTIFICATE OF CORRECTION

Patent No. 3,609,175  Dated September 28, 1971

Inventor(s) Sidney B. Richter

It is certified that error appears in the above-identified patent and that said Letters Patent are hereby corrected as shown below:

Column 3, line 72 in the table under "S" for "46.71" read --13.83--.

Column 4, line 29 for "1.43" read --14.3--.

Column 4, line 67 for "$C_{10}H_{13}NOB2S$" read --$C_{10}H_{13}NO_2S$--.

Column 8, line 45 delete "6-dimethylphenyl-N-hydroxythiocarbamate".

Column 10, line 55 for "Z" read --X--.

Signed and sealed this 28th day of March 1972.

(SEAL)
Attest:

EDWARD M. FLETCHER, JR.
Attesting Officer

ROBERT GOTTSCHALK
Commissioner of Patents